(12) United States Patent
Sorias

(10) Patent No.: US 11,113,947 B2
(45) Date of Patent: Sep. 7, 2021

(54) SMART REMINDER ALARM FOR CARS AND OTHER DEVICES

(71) Applicant: Yeoshua Sorias, Brooklyn, NY (US)

(72) Inventor: Yeoshua Sorias, Brooklyn, NY (US)

(*) Notice: Subject to any disclaimer, the term of this patent is extended or adjusted under 35 U.S.C. 154(b) by 0 days.

(21) Appl. No.: 16/564,411

(22) Filed: Sep. 9, 2019

(65) Prior Publication Data
US 2020/0294384 A1 Sep. 17, 2020

Related U.S. Application Data

(60) Provisional application No. 62/819,306, filed on Mar. 15, 2019.

(51) Int. Cl.
| | |
|---|---|
| *G08B 21/24* | (2006.01) |
| *B60R 16/023* | (2006.01) |
| *B60Q 9/00* | (2006.01) |
| *G08B 21/02* | (2006.01) |

(52) U.S. Cl.
CPC ............. *G08B 21/24* (2013.01); *B60Q 9/00* (2013.01); *B60R 16/023* (2013.01); *G08B 21/02* (2013.01)

(58) Field of Classification Search
CPC .......... G08B 21/24; G08B 21/02; G60Q 9/00; B60R 16/023
See application file for complete search history.

(56) References Cited

U.S. PATENT DOCUMENTS

| | | | | |
|---|---|---|---|---|
| 5,836,616 | A * | 11/1998 | Cooper | B42D 15/022 283/56 |
| 6,002,325 | A * | 12/1999 | Conaway | B60R 22/48 180/268 |
| 6,104,288 | A * | 8/2000 | Hopkins | G08B 3/10 340/545.1 |
| 6,337,491 | B1 * | 1/2002 | Krieg | B60S 1/0822 250/573 |
| 6,339,371 | B1 * | 1/2002 | Baggelaar | B60R 22/48 180/268 |
| 6,853,298 | B1 * | 2/2005 | Stojanowski | B60R 22/48 180/268 |

(Continued)

OTHER PUBLICATIONS

International Search Report and Written Opinion dated Jul. 30, 2020 in corresponding PCT International Application No. PCT/US2020/022610.

*Primary Examiner* — Hoi C Lau
(74) *Attorney, Agent, or Firm* — Ostrolenk Faber LLP

(57) ABSTRACT

A reminder device includes a frame-shaped base defining an opening and configured to be mounted over and around an operational button/handle located in a vehicle or in a home; a lid coupled to the frame-shaped base and configured to close over said frame-shaped base, covering said opening and blocking access to said operational button/handle; a circuit configured to product an audible message upon receiving a trigger signal, said circuit being located in at least one of said framed-shaped base and said lid; and a switch including a first component located on said frame-shaped base and a second component located on said lid and so configured that when said first component and second component are separated from each other by a predetermined distance, when the lid is opened, the switch causes the creation of said trigger signal and the production of said audible alarm.

11 Claims, 17 Drawing Sheets

(56) References Cited

U.S. PATENT DOCUMENTS

| | | | |
|---|---|---|---|
| 7,714,737 B1* | 5/2010 | Morningstar | G08B 21/24 340/667 |
| 9,439,479 B1* | 9/2016 | Vu | B60R 22/00 |
| 9,741,224 B1* | 8/2017 | Singh | G08B 21/22 |
| 10,127,794 B1* | 11/2018 | Britt | B60N 2/002 |
| 10,737,615 B1* | 8/2020 | Moore | B60R 22/48 |
| 2002/0161501 A1 | 10/2002 | Dulin et al. | |
| 2003/0122662 A1 | 7/2003 | Quinonez | |
| 2004/0164856 A1 | 8/2004 | Mesina | |
| 2005/0040960 A1* | 2/2005 | Knox | B60R 22/48 340/668 |
| 2007/0069897 A1* | 3/2007 | Bauchot | G08B 21/24 340/572.1 |
| 2007/0252681 A1* | 11/2007 | Costello | B60R 25/24 340/426.3 |
| 2007/0268119 A1* | 11/2007 | Cram | B60Q 9/00 340/457 |
| 2008/0088426 A1 | 4/2008 | Lima et al. | |
| 2009/0243892 A1* | 10/2009 | Cheung | A44B 11/2569 340/945 |
| 2009/0322507 A1* | 12/2009 | Aoki | B60R 22/48 340/457.1 |
| 2010/0271224 A1* | 10/2010 | Varasteh | A61J 7/04 340/644 |
| 2014/0253314 A1 | 9/2014 | Rambadt et al. | |
| 2014/0266669 A1 | 9/2014 | Fadell et al. | |
| 2014/0278434 A1* | 9/2014 | Martin | H04M 3/4938 704/270.1 |
| 2014/0300461 A1* | 10/2014 | Stark | G08B 21/02 340/457 |
| 2014/0329513 A1* | 11/2014 | Jacob | H04M 1/72463 455/418 |
| 2015/0156567 A1* | 6/2015 | Oliver | G08B 21/24 340/870.07 |
| 2015/0262471 A1* | 9/2015 | Martin | G08B 21/24 340/457 |
| 2015/0360834 A1* | 12/2015 | Mikhail | G16H 20/13 340/384.5 |
| 2016/0272114 A1 | 9/2016 | Medina | |
| 2016/0307432 A1 | 10/2016 | Downs | |
| 2017/0305388 A1* | 10/2017 | Koike | B60R 22/48 |
| 2018/0053398 A1* | 2/2018 | Kharbawi | G08B 21/22 |
| 2018/0228696 A1* | 8/2018 | Rawal | A61J 7/049 |
| 2019/0331410 A1* | 10/2019 | Li | F25D 29/008 |
| 2020/0294384 A1* | 9/2020 | Sorias | B60Q 9/00 |
| 2020/0345721 A1* | 11/2020 | Iorio | A61J 1/03 |
| 2021/0056832 A1* | 2/2021 | Sorias | G08B 21/24 |

* cited by examiner

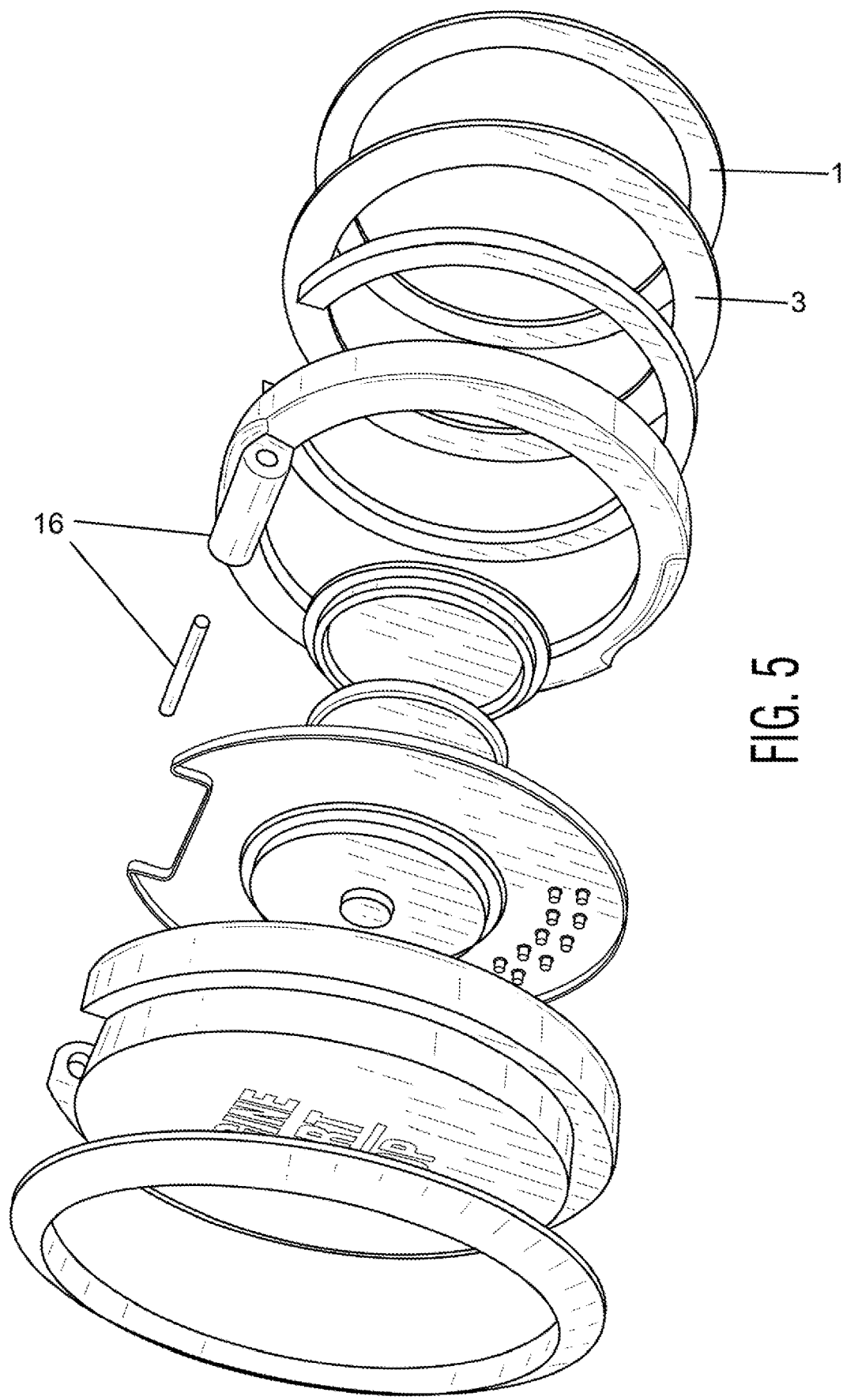

SMART REMINDER ALARM FOR CARS AND OTHER DEVICES

CROSS-REFERENCE TO RELATED APPLICATION

The present non-provisional patent application claims the benefit of and priority to U.S. Provisional Patent Application No. 62/819,306, filed Mar. 15, 2019, by Yeoshua Sorias, and entitled "SMART REMINDER ALARM FOR CARS AND OTHER DEVICES," the entire content of which is incorporated herein by reference.

BACKGROUND OF THE INVENTION

The present invention is generally directed to a reminder alarm and more particularly to an alarm configured to prevent forgetting something in the car and other places.

The prior art relating to the present invention is exemplified by United States Patent Publications 2016/0307432, 2016/0272114, 2008/0088426, 2007/0268119, 2004/0164856 and 2003/0122662, the contents of which are incorporated by reference herein.

As described in various prior-art documents including in United States Patent Publication 2007/0268119, every year, children are injured or die due to being left unattended inside of parked vehicles, and in some instances, these children are left only for a few minutes. More alarming, the numbers of deaths due to this have been increasing each year. It certainly is not the intention of the vehicle operators to subject these children to such dangers. In many cases, the vehicle operators just need simple reminding of the presence of the children.

If the outdoor temperature is 90° F., the interior temperature of a parked vehicle can rise to 125° F. in only twenty minutes. After another twenty minutes, the temperature can rise to 150° F., and even if the vehicle's windows are open, the interior temperature will only be 10° F. cooler, which is still a dangerous level. Being exposed to temperatures of 100° F. can be fatal to a small child. Such heat rapidly overwhelms the ability of small children's bodies to regulate their own temperatures. When exposed to such temperatures in the closed environment of an automobile, children's bodies can go into shock and circulation to vital organs will begin to fail, resulting in heat stroke in just a few minutes.

This circumstance can happen even when outdoor temperatures are cool. Even if the outdoor temperature is as low as 60° F., the interior temperature of a vehicle can reach fatal levels for a child in less than twenty minutes. This danger is far more lethal than commonly realized, made evident by the increase in annual occurrences of fatality due to this circumstance. A child's core body temperature can increase three-to-five times faster than an adult's, so even a quick stop at the store can be fatal to a young child. Unfortunately, not enough adults are aware of this risk.

Some parents admittedly believe that it is perfectly fine to leave a small child alone in a car, and for first-time parents of ages twenty-four and younger, the belief that this potentially fatal incident is perfectly acceptable is more common than with older parents. The perception of this risk is becoming more well-known, and today it is illegal in twelve (12) states to leave a child unattended in a parked vehicle. Unfortunately, these strategic legal efforts have not proven completely effective as children are still left alone inside of parked vehicles.

In view of the foregoing, there is a need for alerting vehicle operators of the presence of a child in the vehicle.

There is also a need for a method of reminding the vehicle operators of the dangers of leaving a child unattended in a parked vehicle.

The prior art reveals that the approach to child safety that has been employed in the past was to sense the presence of a child in a car seat located in the vehicle. However, this requires special car seats outfitted with very sophisticated child detection circuitry that raises the expense and is likely to result in many people opting not to purchase such special car seats.

SUMMARY OF THE INVENTION

Accordingly, it is an object of the present invention to provide child safety and alarm devices that overcome the drawbacks of the prior art.

It is another object of the present invention to provide an easily installable and very inexpensive device that provides a reminder to check whether a baby is in the car before leaving a vehicle.

The foregoing other objects of the invention are realized by means of a simple product that fits around and covers the car ignition on/off push button and that outputs an alarm sound every time the vehicle is either turned on or turned off by its driver, to remind the driver/parent/adult to check for the presence of a baby in the vehicle.

In accordance with other embodiments of the invention, a tiny voice recorder is attached to the buckle of the driver's seatbelt and the recorder is triggered to play a pre-recorded message whenever the seatbelt is removed from the buckle. The message can be, for example, "Don't forget baby." "Stop for groceries." or the like. The message is very short on the order of less than thirty seconds and can be freely re-recorded at the driver's whim.

In yet another embodiment of the invention, an accelerometer is affixed to the seatbelt whereby when the seatbelt is opened and a motion is made in a diagonal direction to remove it to the back of the seat, it triggers the recorder to issue its message.

In preferred embodiments of the invention, the device of the present invention includes a frame-shaped base defining an opening and configured to be mounted over and around an operational button/handle located in a vehicle or in a home; a lid coupled to the frame-shaped base and configured to close over said frame-shaped base, covering said opening and blocking access to said operational button/handle; a circuit configured to product an audible message upon receiving a trigger signal, said circuit being located in at least one of said framed-shaped base and said lid; and a switch including a first component located on said frame-shaped base and a second component located on said lid and so configured that when said first component and second component are separated from each other by a predetermined distance, when the lid is opened, the switch causes the creation of said trigger signal and the production of said audible alarm.

The circuit may include a portable recorder that is removeably mounted to a buckle of the seatbelt system. For example, the circuit includes a recorder that is mounted to a flexible strap of a seatbelt system and including an accelerometer that senses the movement of the strap when it is disengaged from a buckle to thereby trigger the production of a pre-recorded audible message.

Other features and advantages of the present invention will become apparent from the following description of the invention which refers to the accompanying drawings.

BRIEF DESCRIPTION OF THE DRAWINGS

FIG. 5 is a further exploded view of the device of FIG. 4.

DETAILED DESCRIPTION OF EMBODIMENTS OF THE INVENTION

Figure 1:
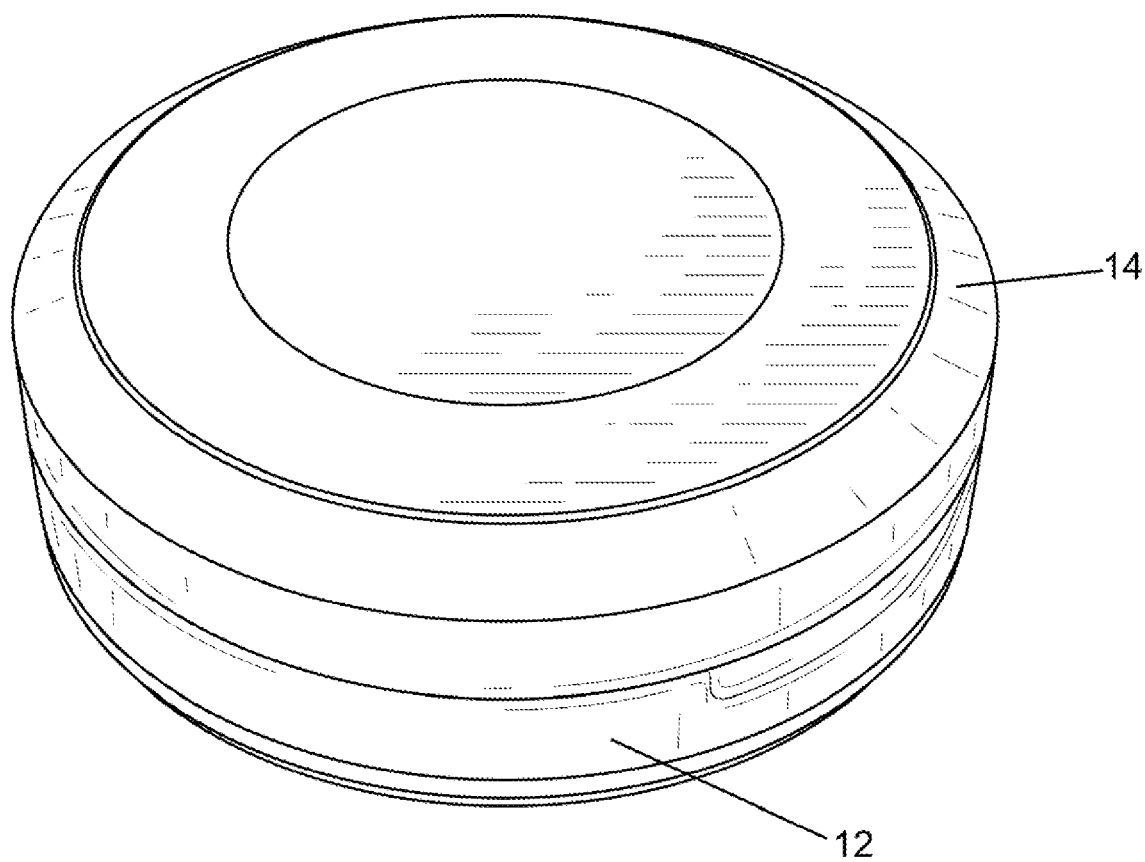
FIG. 1 is a perspective of a vehicle child minder of the present invention in accordance with the first embodiment thereof.

FIG. 1 is a perspective of the invention, showing the vehicle child minder device 10 to be a round, circular disc with an interior that is substantially open and that fits around the ignition push on/off button 5 (FIG. 6A) of modern vehicles. The device comprises a base 12 that fits over and around the ignition push button and an openable cover 14.

Figure 2:
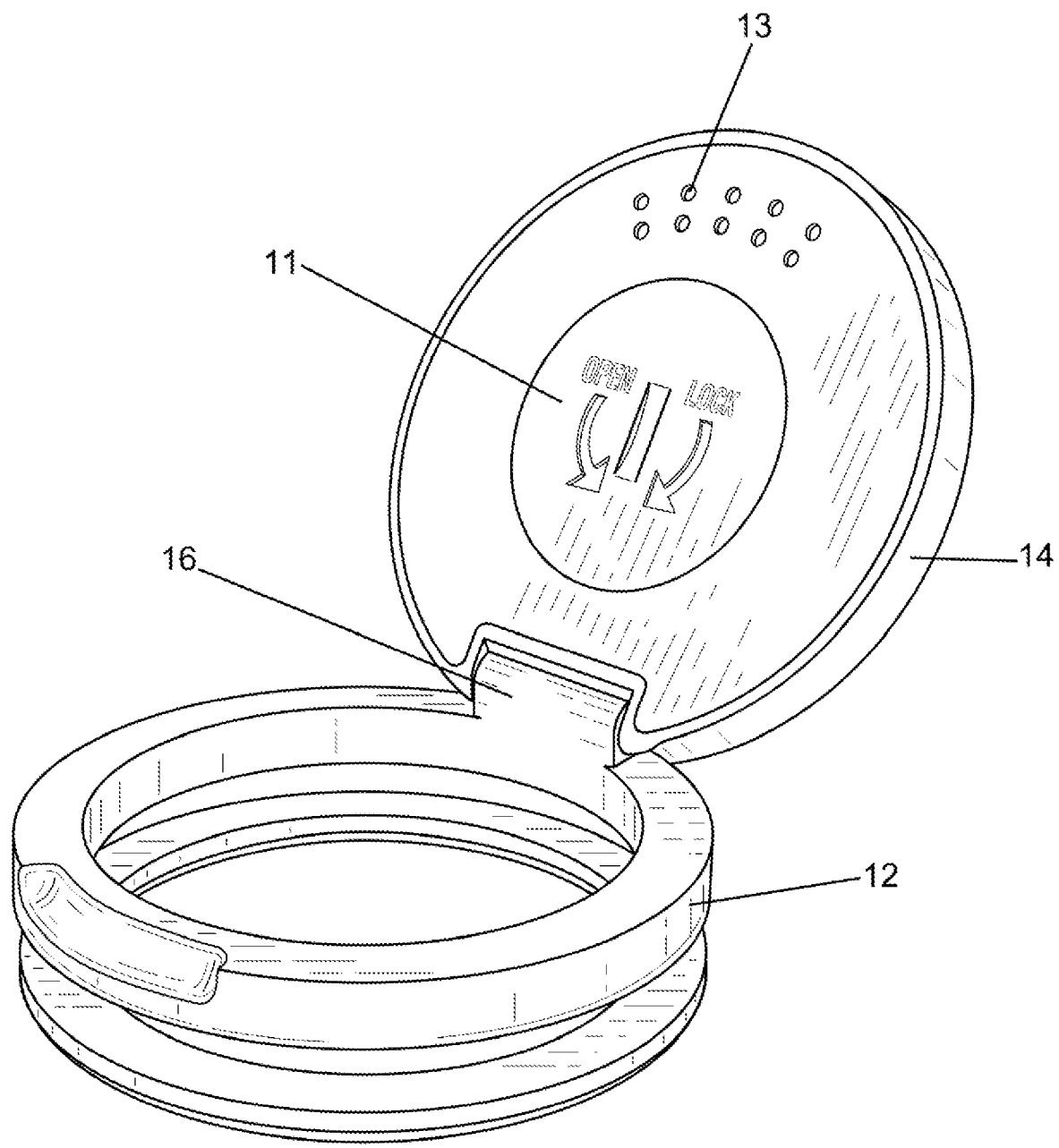
FIG. 2 is a perspective of the vehicle child minder of FIG. 1 in an open position.
Figure 3:
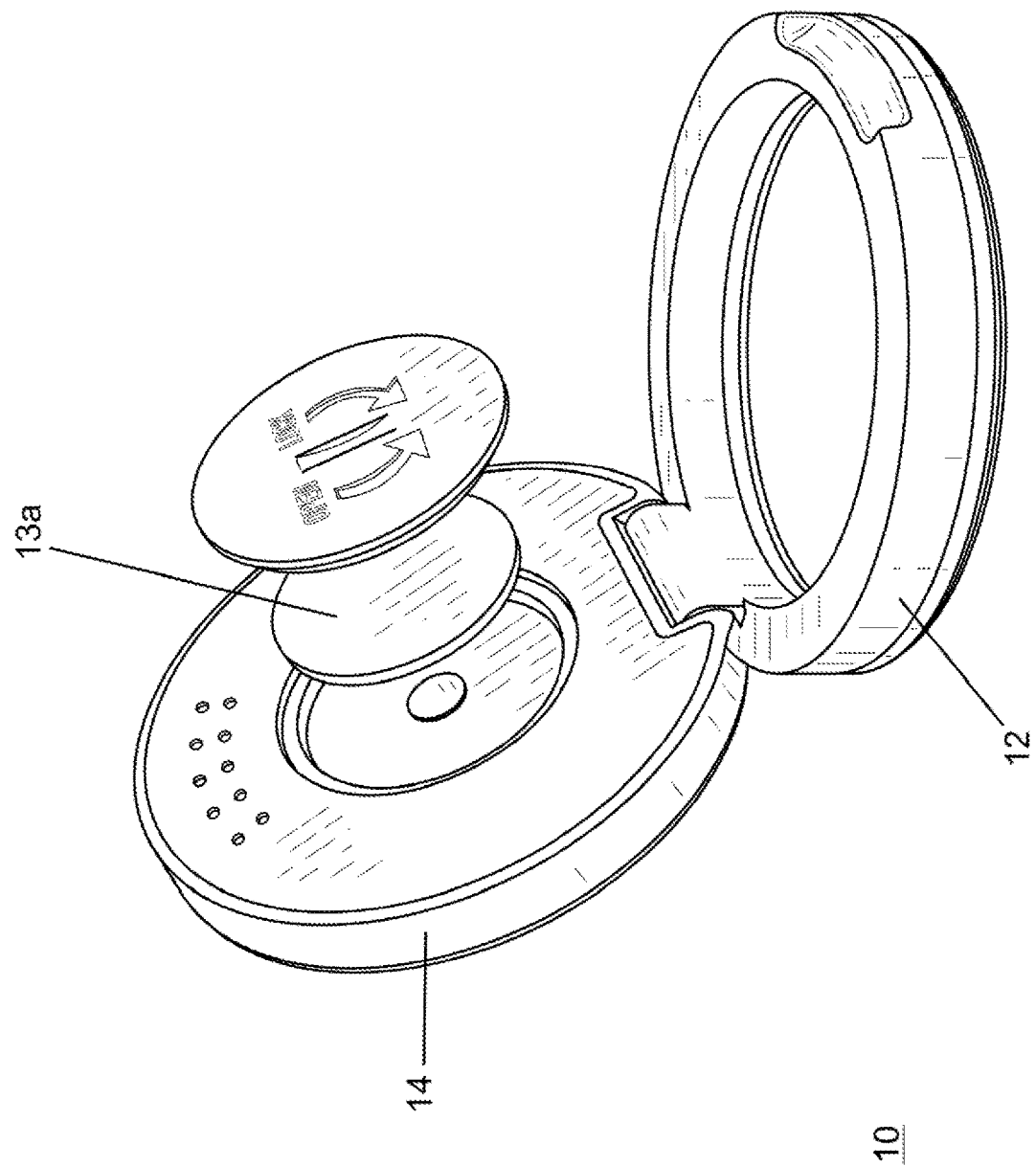
FIG. 3 is another perspective of FIG. 1 partially in exploded view.

In FIG. 2 are shown a number of components of the device 10 including its battery cover 11 which can be opened to install a battery 13a (FIG. 3) to power an interior circuit that is located in the top and bottom housings 12, 14, which circuitry produces an audible sound through speaker holes 13, every time the top housing or lid 14 is lifted relative to its base 12 which is attached to the body of the vehicle around the on/off ignition push-button. The circuitry that generates the audible message or tone is conventional and does not require description or explication. Playing of the audible message is initiated by a conventional trigger signal that is activated when a switch is opened or closed, as widely known in the art. The comparative dimensional sizes of the components are illustrated in FIG. 3, including the battery 13a.

Figure 4:
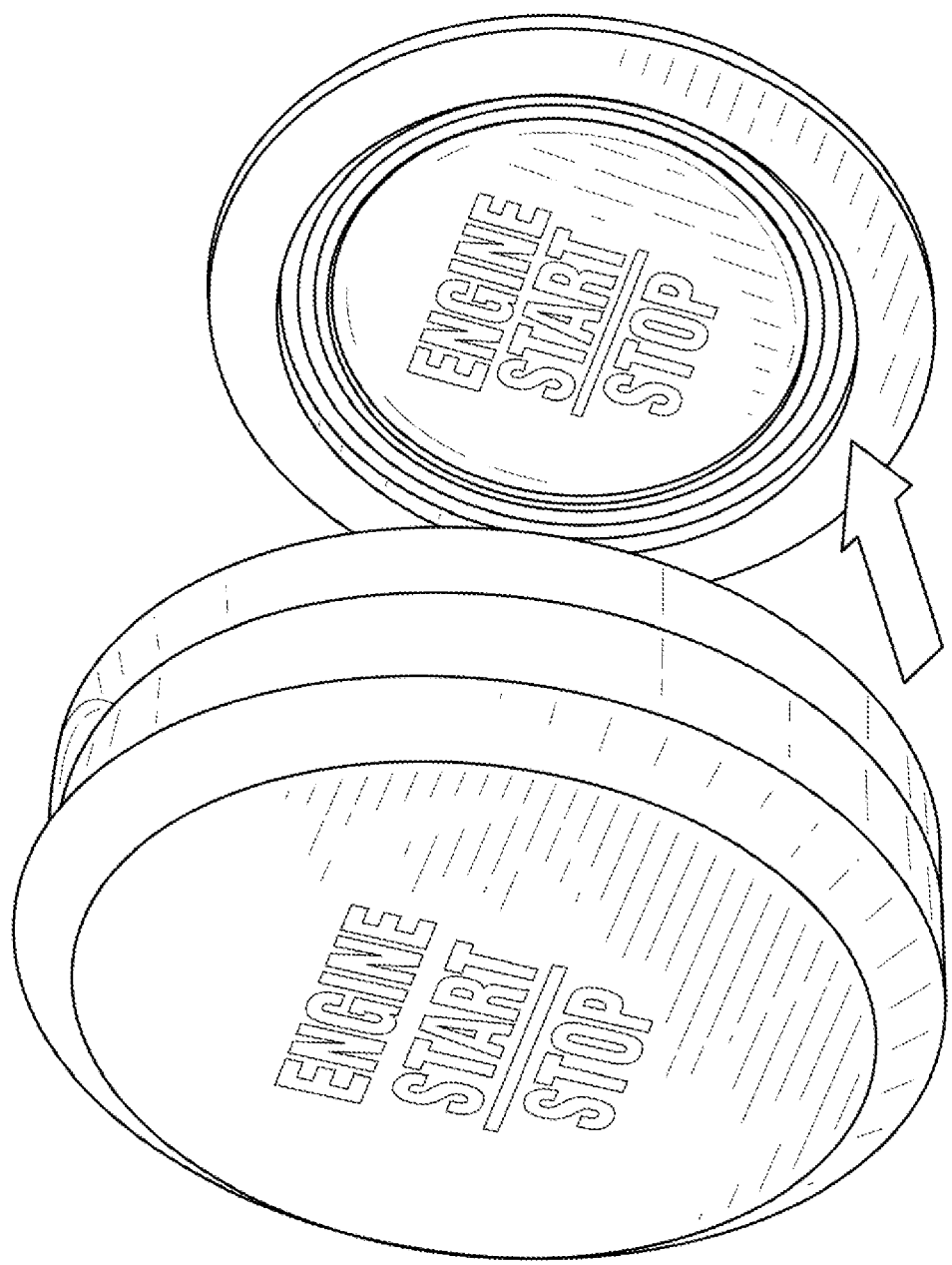
FIG. 4 diametrically illustrates operation of the embodiment of FIG. 1.

FIG. 4 shows further details of a magnetic attachment.

FIG. 5 is an exploded view that illustrates the top housing 14a (FIG. 6B) including a magnetic ring, and a bottom housing 12a holding the circuitry and the battery. The top/bottom housing is pivotally connected to a stand via a hinge 16. The band 3 is magnetic and attaches to a metal plate 1 that can be glued to the vehicle dashboard around the ignition push button. The need for the adhesive tape is because the panel of a car is usually made of plastic rather than metal. However, if there is any metal, then the band could be adhered directly around the vehicle ignition on/off push button.

Figure 6A:
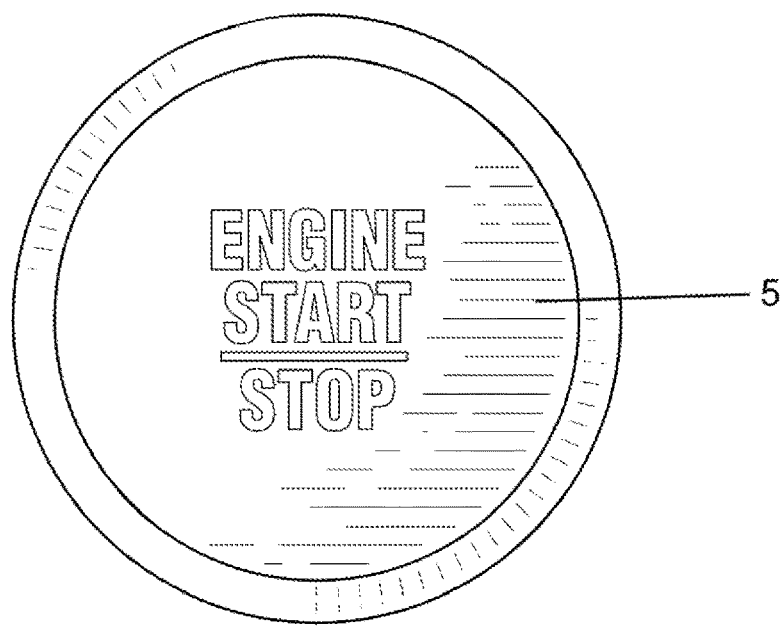
FIGS. 6A, 6B and 6C explicate the operation of the embodiment of FIG. 4.
Figure 6B:
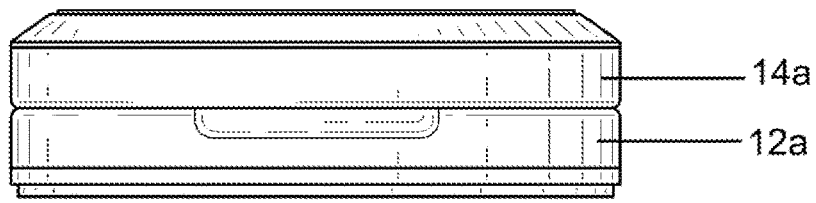
Figure 6C:
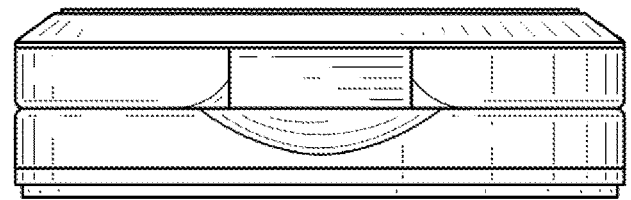

FIGS. 6A, 6B and 6C provide approximate sizes for the device of the present invention.

Figure 7:
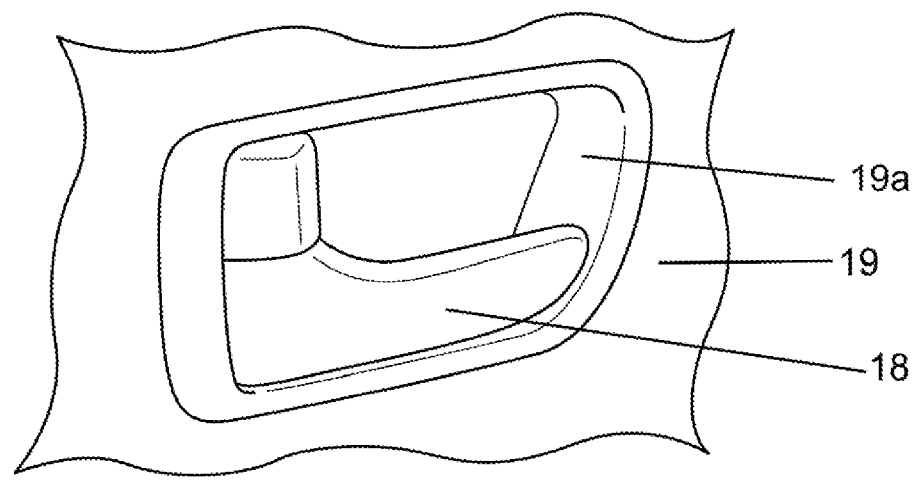
FIG. 7 illustrates a conventional automobile door opening handle.

FIG. 7 shows a prior art door handle 18 in a car door 19 with a handle interior 19a.

Figure 8:
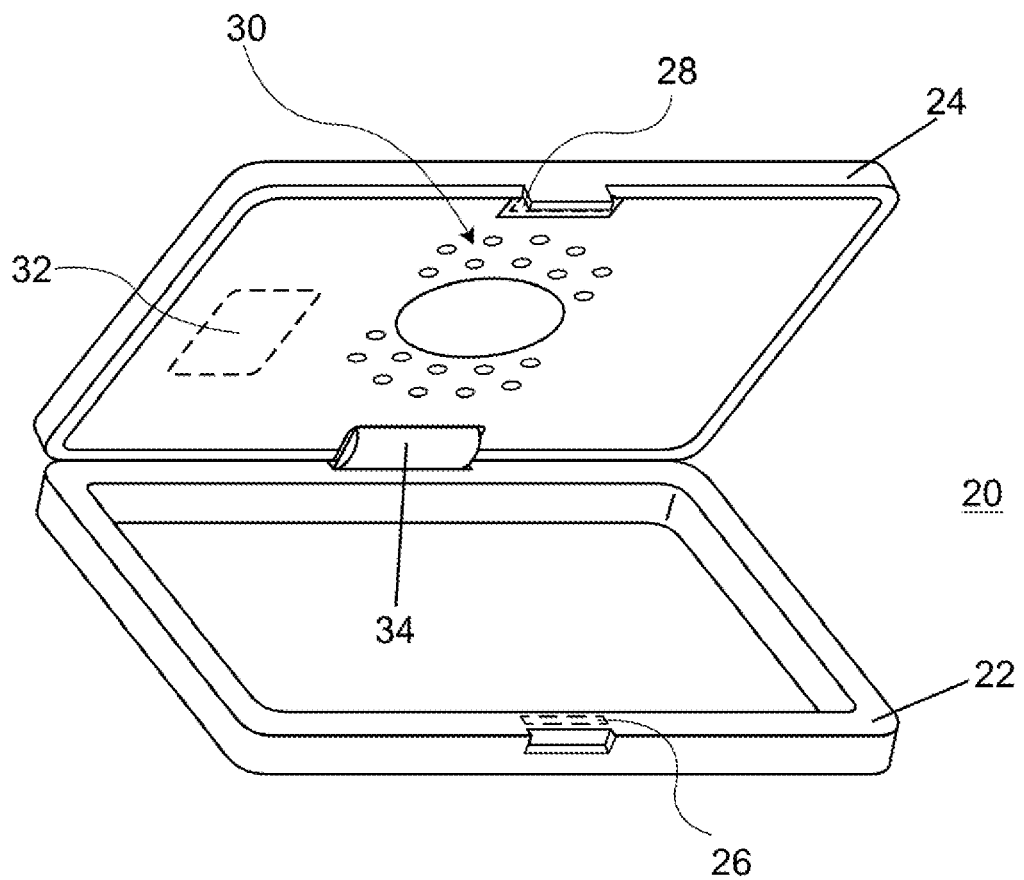
FIG. 8 shows another embodiment of the invention configured to fit over the door handle of FIG. 7.

FIG. 8 shows an embodiment of a baby reminder mechanism 20 with no recording ability, just an alarm sound. The baby minder mechanism 20 has a window or frame-shaped base 22 hingedly connected by hinge 34 to the top lid 24 which houses therein a speaker 30 and circuitry (not shown) that is run by a battery 32. When the base 22 is fitted around the handle 18, access to the handle is covered by the lid 24. However, when the lid 24 is opened, the magnet 28 interacts with the base magnet 26 which activates the speaker 30 alerting the driver.

Figure 9:
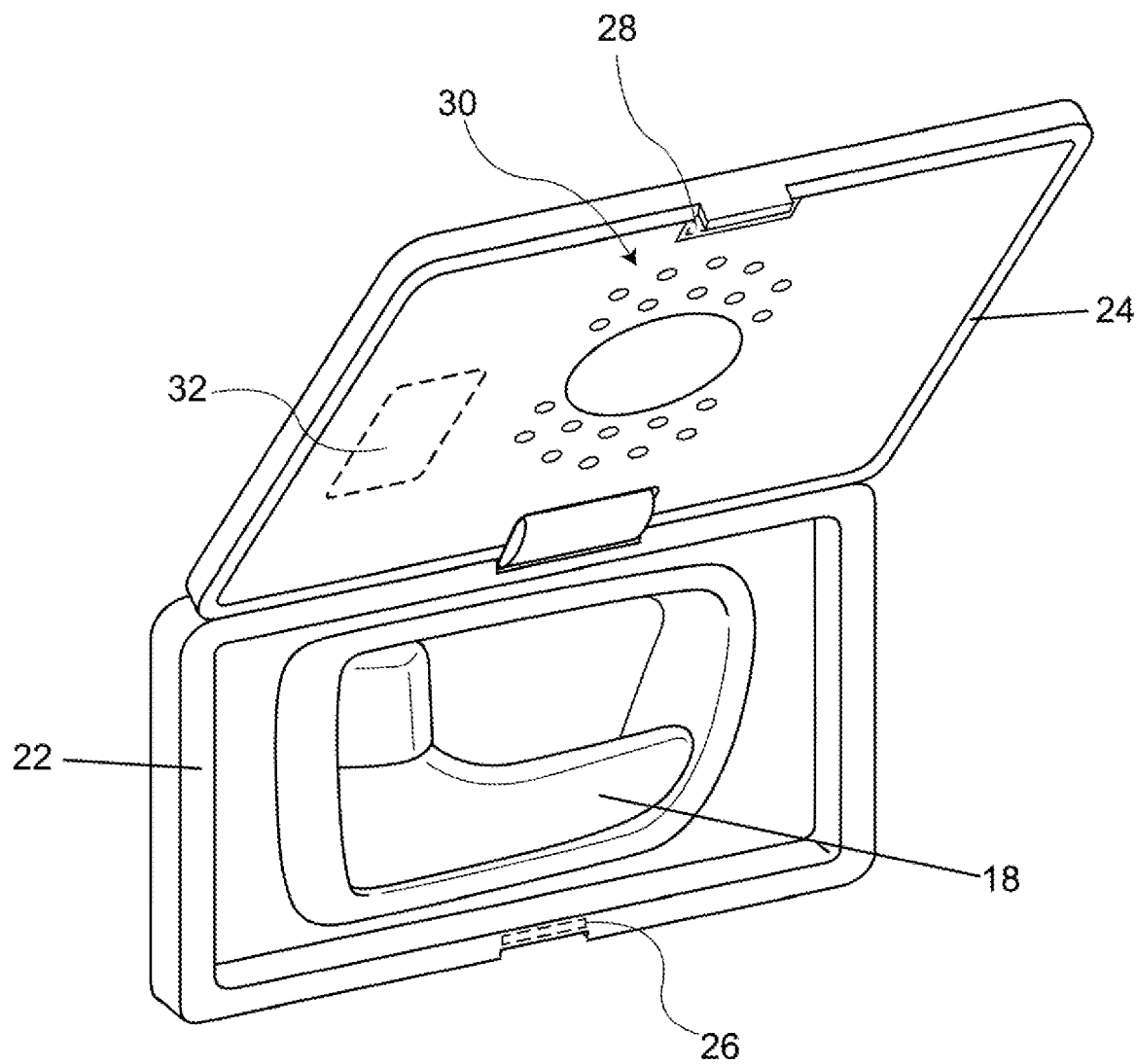
FIG. 9 shows the child minder device of FIG. 8 in an open position.

FIG. 9 shows the device in FIG. 8 placed over/around door handle 14. It comprises an open frame 22 that is adhesively attached to the door, centered over the door handle 14. The lid 24 has a magnet activated switch 28. When the lid is closed, the switch is closed. With the lid is opened, the switch is open and a pre-set message plays. A person must access the door handle to leave the car, and therefore switch activation of the minder device becomes an involuntary action.

Figure 10:
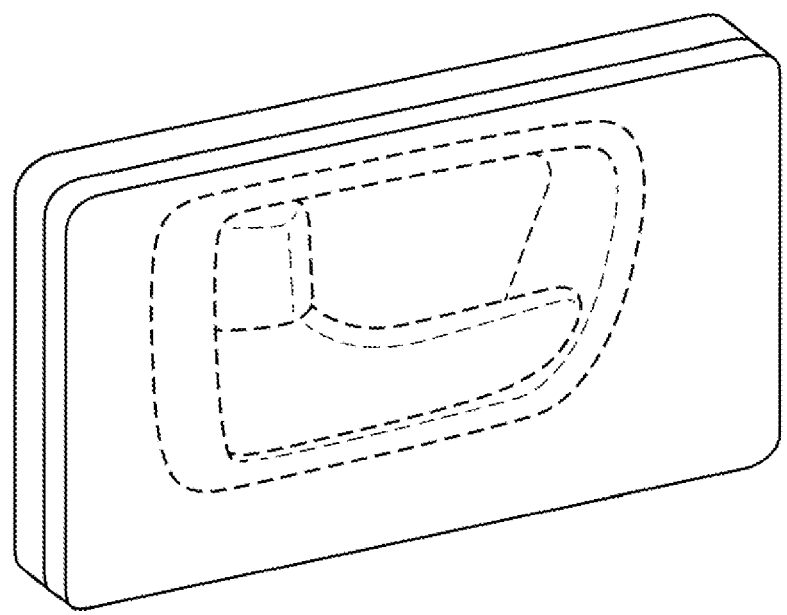
FIG. 10 shows the device of FIG. 9 mounted over the door handle.

FIG. 10 shows the device in FIG. 8 with the lid closed.

Figure 11:
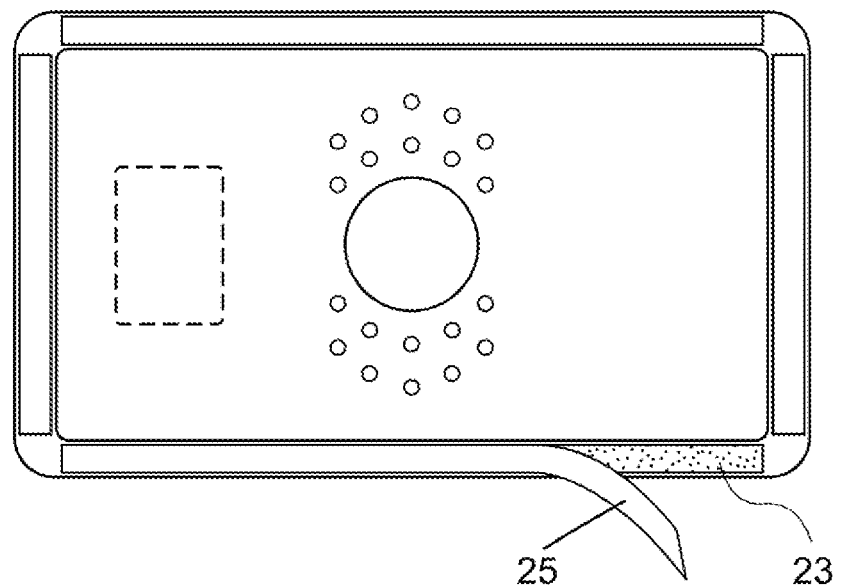
FIG. 11 shows a mode of attaching the device of FIG. 9 to a vehicle car body.

FIG. 11 shows the rear of device in FIG. 8 in the lid closed position. It shows adhesive strips 23, 25 for attaching to the door. The speaker in the lid is visible through the opening in the lower frame.

Figure 12:
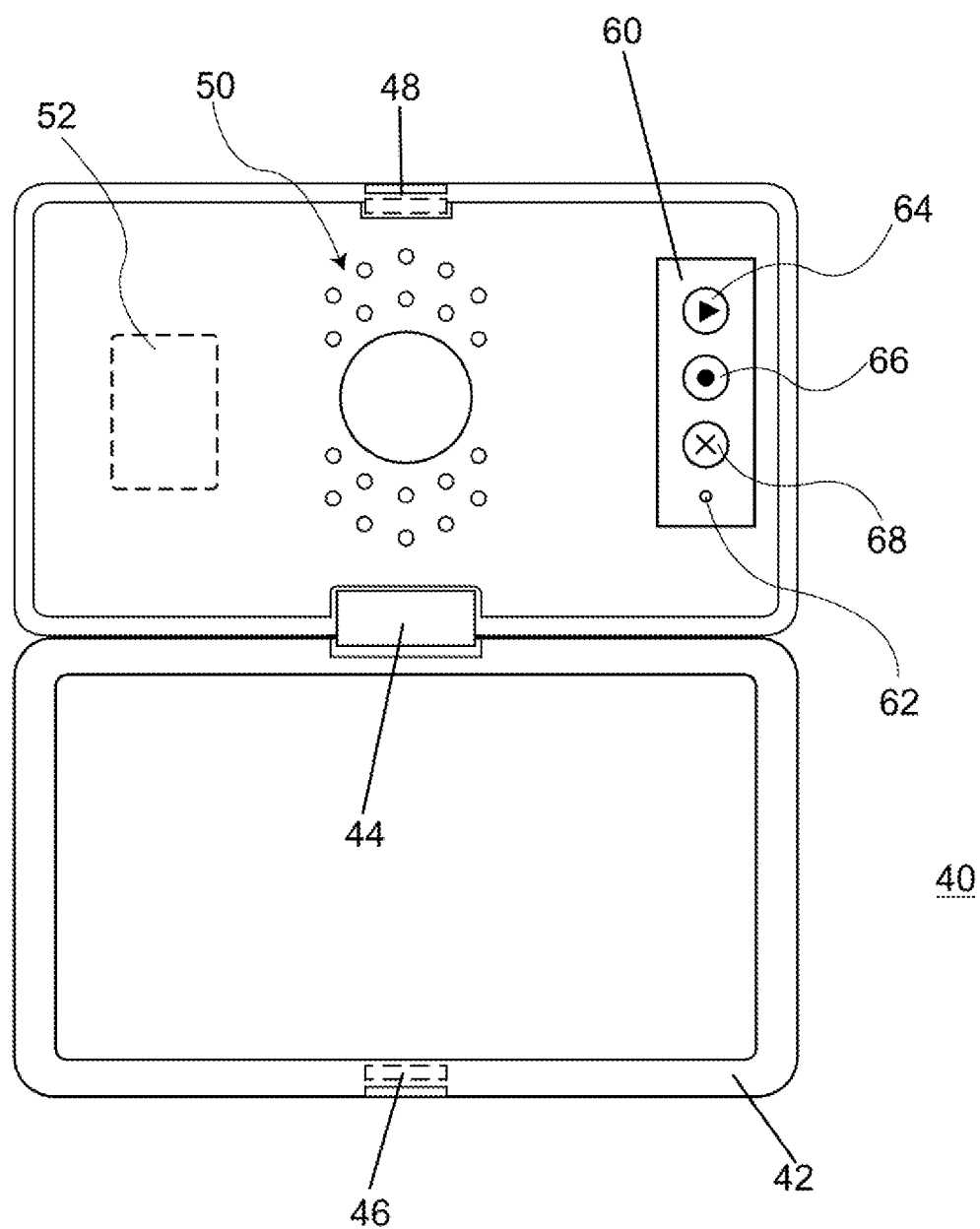
FIG. 12 shows a further feature of the child minder device of FIG. 9.

FIG. 12 shows another embodiment of a minder 40 with an ability to record, play back and delete the message so it can be customized for any type of reminder. See the recorder control 16 with a play button 64, a record button 66 and a delete button 68. When the record button is pressed, the microphone 62 receives the sound that is recorded in the memory of the recorder 60. When the magnets 48 and 46 are activated (as when the top is rotated around the hinge 44), the recorder 60 is activated producing the recorded sound through the speaker 50. The circuitry is powered by the battery 52.

Figure 13:
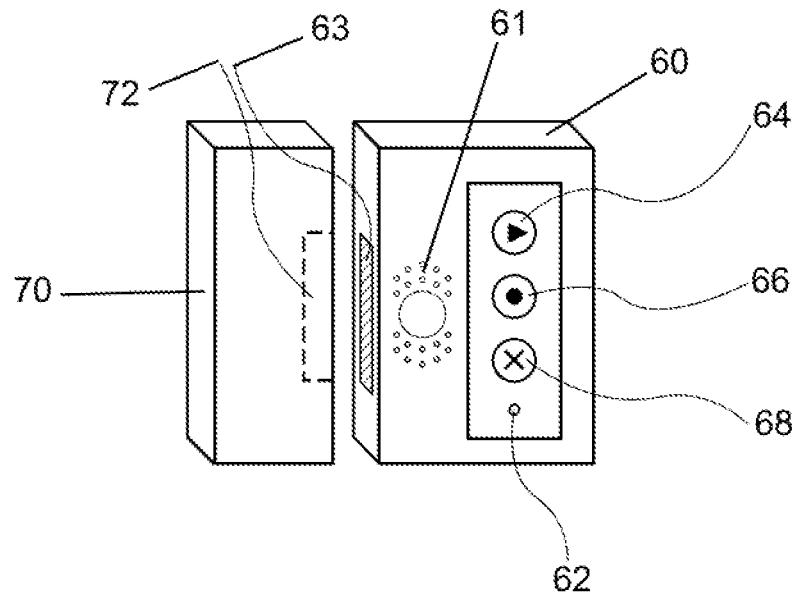
FIG. 13 shows a recorder component and its trigger for the embodiment of FIG. 9.

FIG. 13 shows a magnet switched device with the custom message abilities of the FIG. 12 device. In this figure, the play button 64, the record button 66 and the delete button 68 are the same as in FIG. 12, as is the speaker 61 and the microphone 62. However, the magnet switch 63 is shown located adjacent the magnet 72 of the device 70 so that when the two are separated, the voice is activated.

Figure 14:
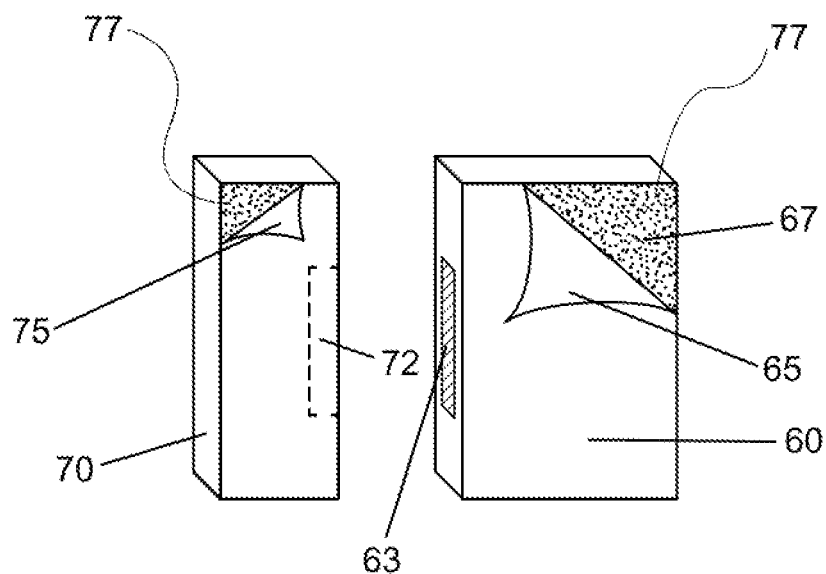
FIG. 14 shows an attaching mode for the device of FIG. 13.

FIG. 14 shows the rear of the device in FIG. 13, with adhesive mounting strips 65, 67, 70 and 77. It can be mounted to any surface, as shown in FIGS. 9-11. It can be mounted to any surface that has a door-like action of a stationary frame with a movable door or window. A toy box with a message to clean up your toys is another example.

"Remember to turn off the light" could be the message on a closet door or basement door.

Figure 15:
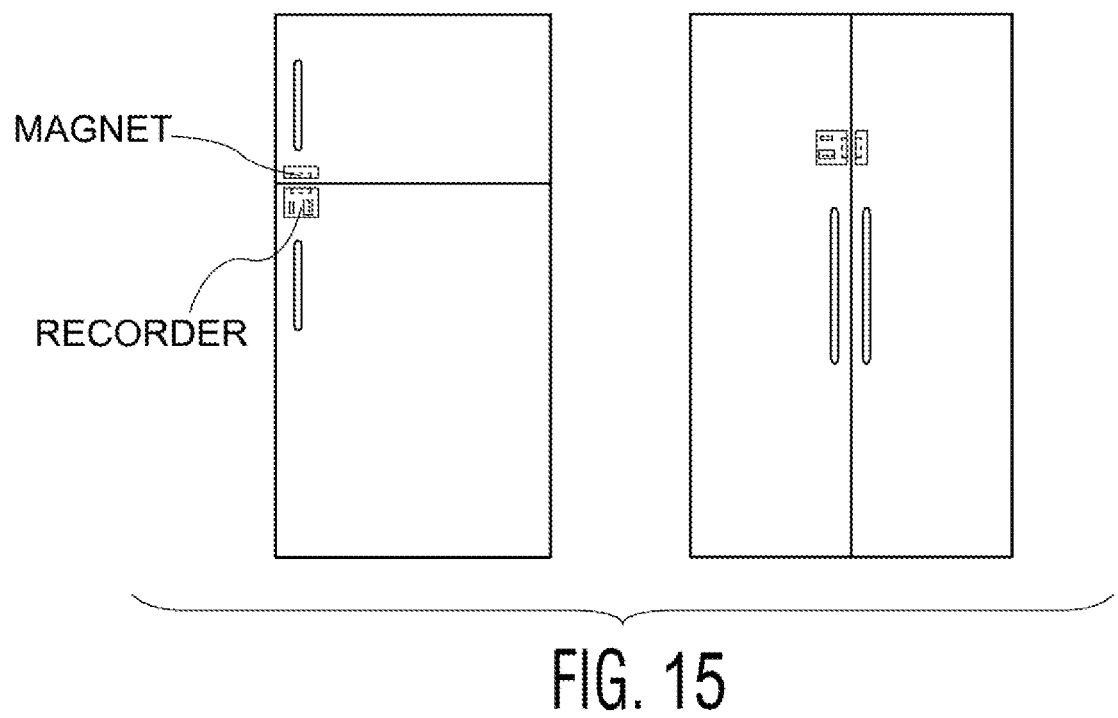
FIG. 15 shows the device of the present invention mounted to a refrigerator door.

FIG. 15 shows the FIG. 13 device on two refrigerator styles, able to display "Remember to buy milk."

Figure 16:
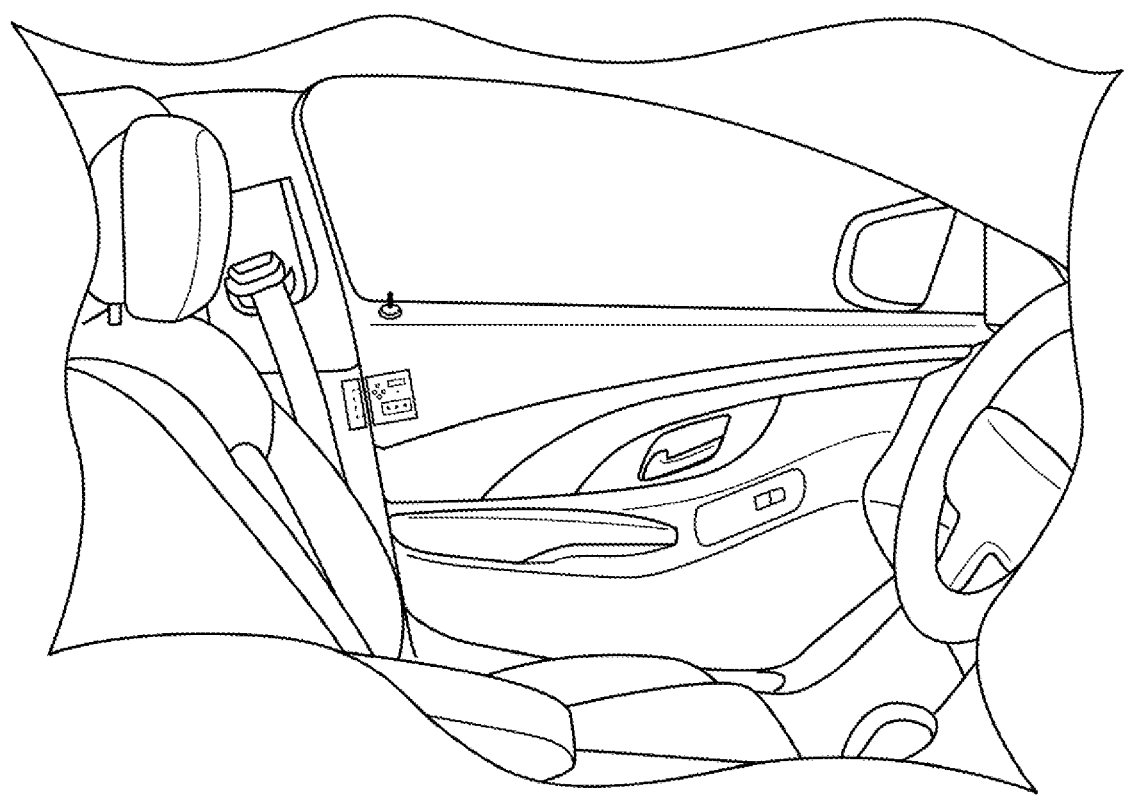
FIG. 16 shows the device of the present invention mounted to a vehicle door.

FIG. 16 shows the FIG. 13 device on the interior of a car door.

Figure 17:
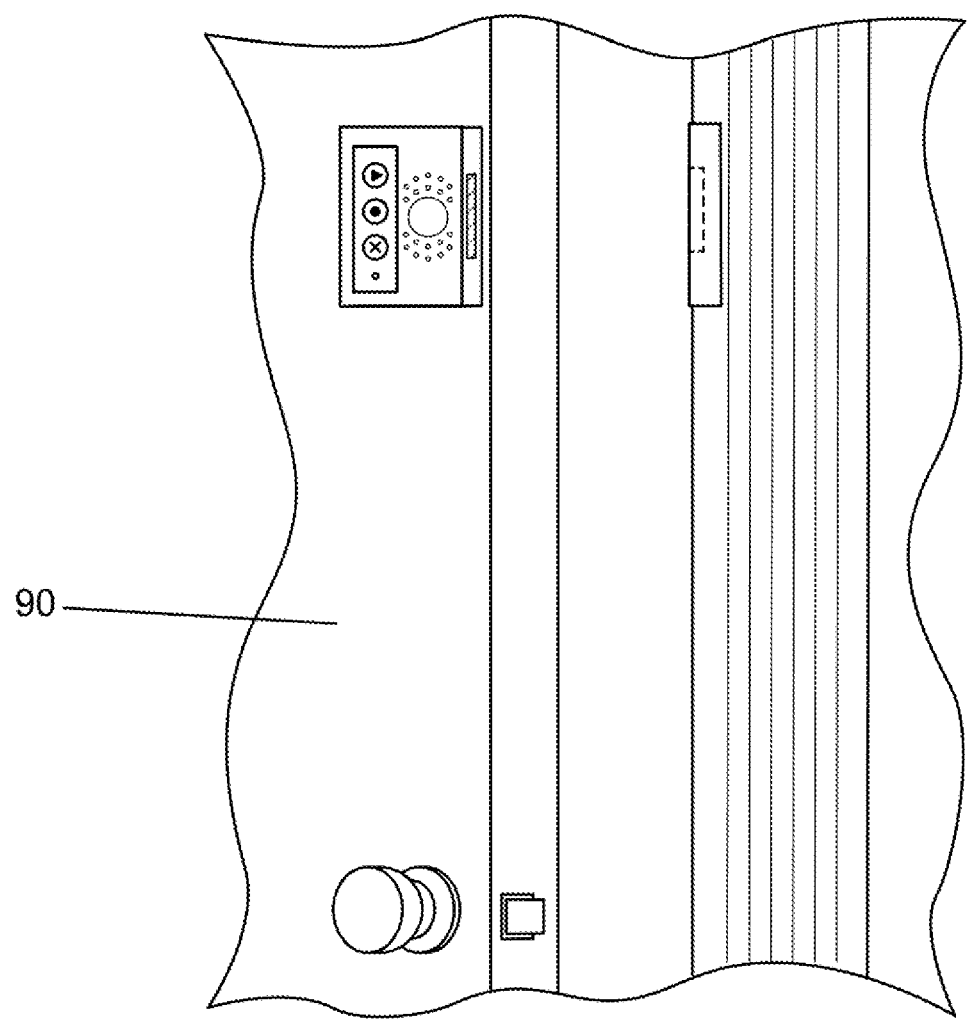
FIG. 17 shows the device of the present invention mounted to a home or office door.

FIG. 17 shows the FIG. 13 device on the ordinary interior home door 90 with the message "Remember to turn on the alarm."

Figure 18:
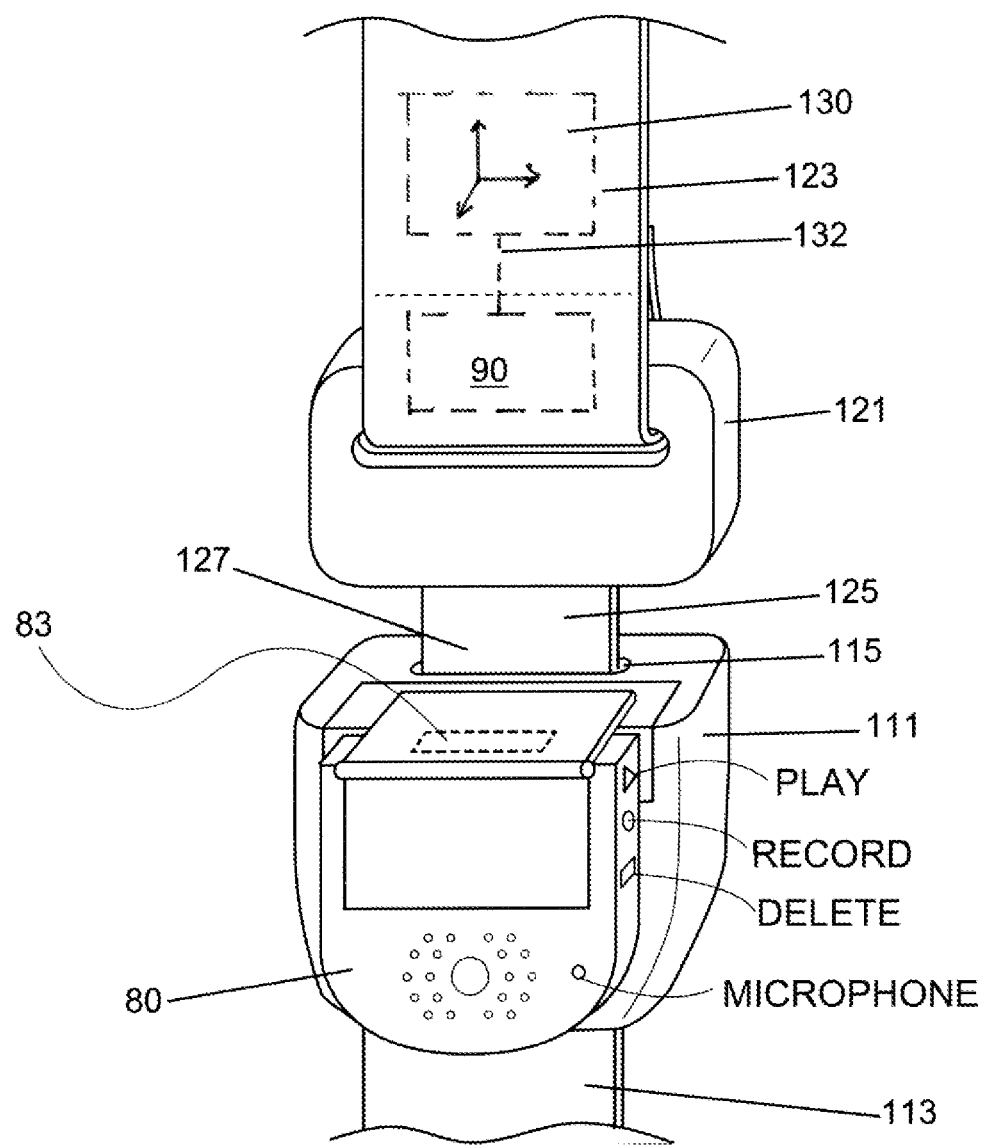
FIG. 18 shows a further embodiment of the invention in which a child minder device is located at the seatbelt buckle of the vehicle.

FIG. 18 shows a seatbelt version, using a magnet switch and a recordable message. A hinged flap switch covers the seat belt switch. The flap must be rotated and activate the device to access seatbelt removal. More specifically, the buckle 111 associated with the seatbelt 129 is affixed to the body of the car with the strip 113. Adhered to the outside of the buckle by glue or by an open housing is the recorder 80 with its various controls and speaker as shown. The speaker is activated by magnet 83 when the metal clasp 125 of the seatbelt 121 is removed from its receptacle or buckle 115, as previously described.

Figure 19:
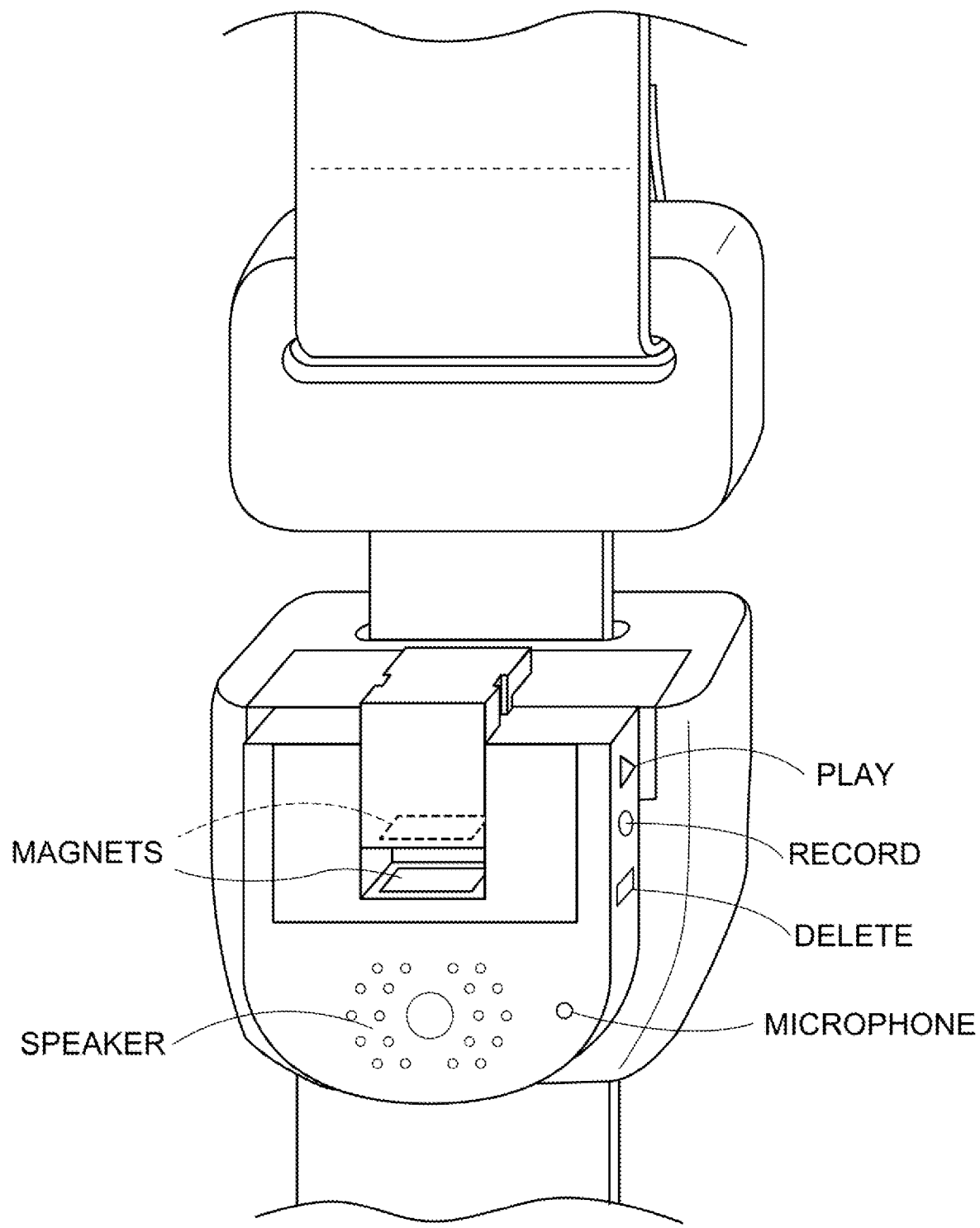
FIG. 19 shows a variant of FIG. 18.

FIG. 19 shows a second embodiment of the seatbelt device. The device has a switch that rides in a channel. The switch is an upside down L. The thickened tab overlaps the seatbelt switch. One must push tab in to then push seatbelt switch in. Magnets in the base of the L switch make contact and activate the message.

Figure 20:
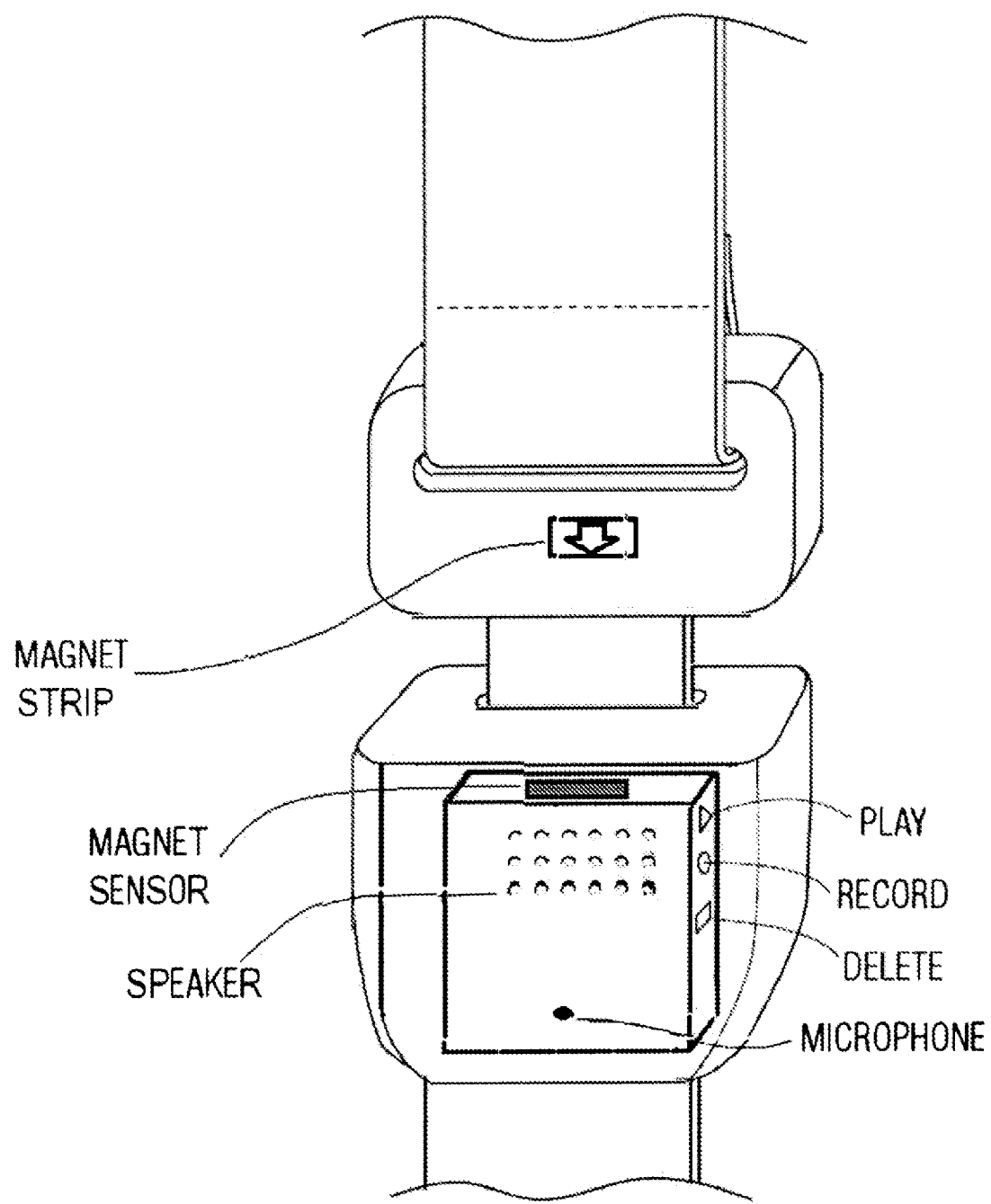
FIG. 20 shows another variant of FIG. 18.
Figure 21:
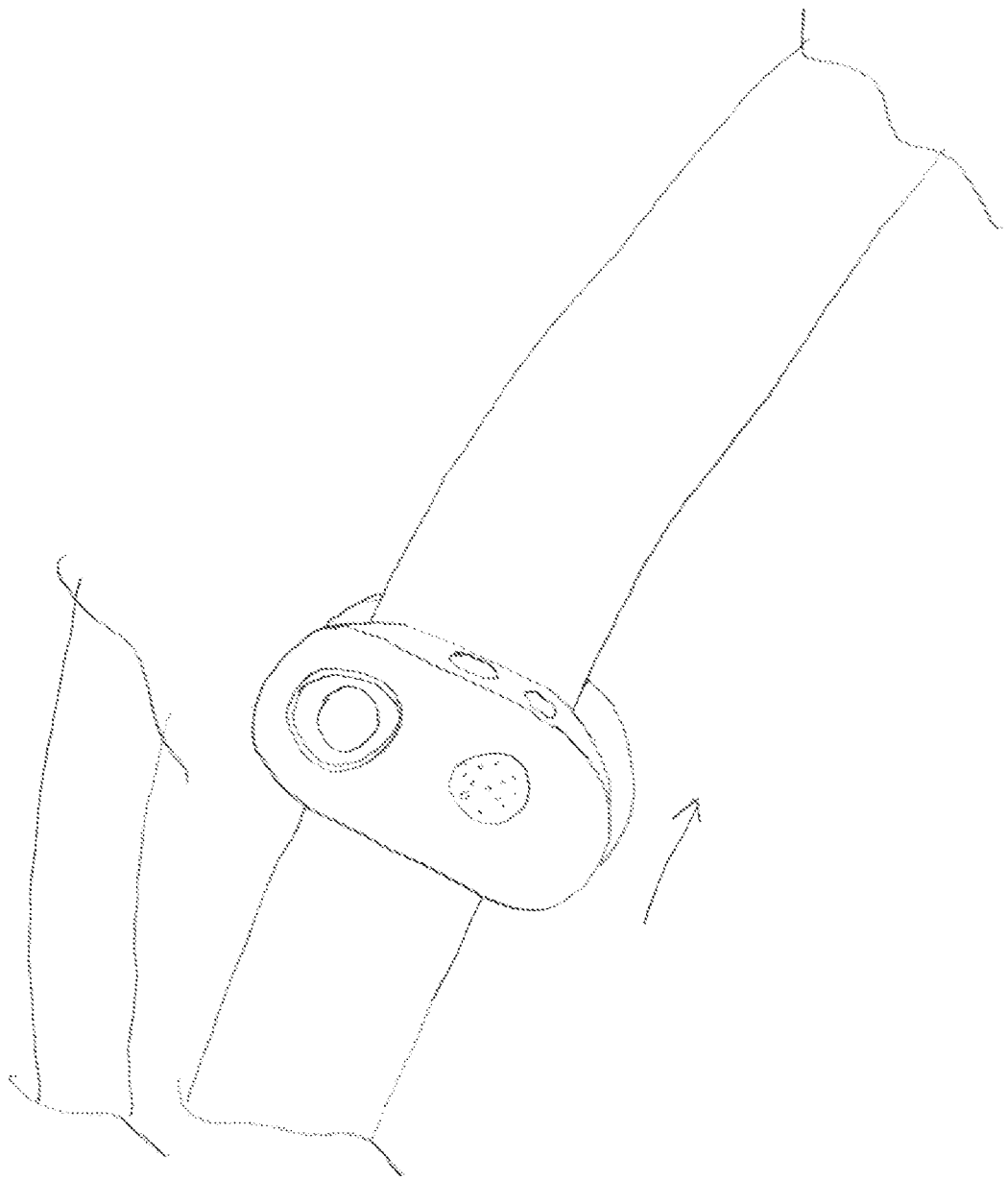
FIG. 21 further explicates the mounting of one variant of the child minder of the present invention to adjustable strap of the seat belt system.

In an alternate embodiment shown in dashed lines in FIG. 18, a recorder 90 substantially identical to the recorder 80 shown in this figure is mounted instead of the buckle into the inserting head into the seatbelt strap 123 and that recorder is coupled via an electrical line 132 to an accelerometer 130 that is able to detect the motion of a seatbelt as when it is disengaged from the bottom buckle 111. In other respects, the operation is identical to as described above. The accelerometer device 130 is widely known in the field and available as an off-the-shelf device that can provide an on/off trigger signal to the recorder 90, all as previously described. See also FIGS. 20 and 21 that depict the foregoing.

Although the present invention has been described in relation to particular embodiments thereof, many other variations and modifications and other uses will become apparent to those skilled in the art. It is preferred, therefore, that the present invention be limited not by the specific disclosure herein, but only by the appended claim.

What is claimed is:

1. A recording device, comprising:
   a recorder that enables the recording of a short audible message reminder that is triggered for playback by built-in sensors;
   a frame-shaped base defining an opening and configured to be mounted over and around an operational button/handle located in a vehicle or in a home; a lid coupled to the frame-shaped base and configured to close over said frame-shaped base, covering said opening and blocking access to said operational button/handle;
   a circuit configured to produce the audible message upon receiving a trigger signal, said circuit being located in at least one of said framed-shaped base and or said lid; and
   a switch including a first component located on said frame-shaped base and a second component located on said lid and so configured that when said first component and second component are separated from each other by a predetermined distance, when the lid is opened, the switch causes the creation of said trigger signal and the production of said audible alarm or message.

2. The recording device of claim 1, wherein the audio message is a reminder to the driver not to forget something in the car before leaving said car.

3. The recording device of claim 1, wherein the frame-shaped base is configured to fit over and to adhere around or next to a vehicle engine start/stop button.

4. The recording device of claim 1, wherein the frame-shaped base is configured to fit around a driver's door handle.

5. The recording device of claim 1, including adhesive strips associated with the frame-shaped base for enabling the frame-shaped base to be adhered to a body where operational button/handle is located.

6. The recording device of claim 1, wherein the first component and second components are magnetic components, at least one of which is capable of holding a switch in a first position.

7. The Recording device of claim 1, wherein the recording device is mounted to a home front door.

8. The recording device of claim 1, wherein the recording device is mounted to a door of a refrigerator.

9. The Recording device of claim 1, wherein the recording device is removable and mounted to a seatbelt in vehicle.

10. The Recording device of claim 1, wherein the recording device removably mounted to a buckle of a seatbelt.

11. The recording device of claim 1, wherein the circuit is mounted via a flexible strap to a seatbelt; includes an accelerometer sensor that senses the movement of the device when the buckle is disengaged and thereby triggers the audible message.

* * * * *